UNITED STATES PATENT OFFICE.

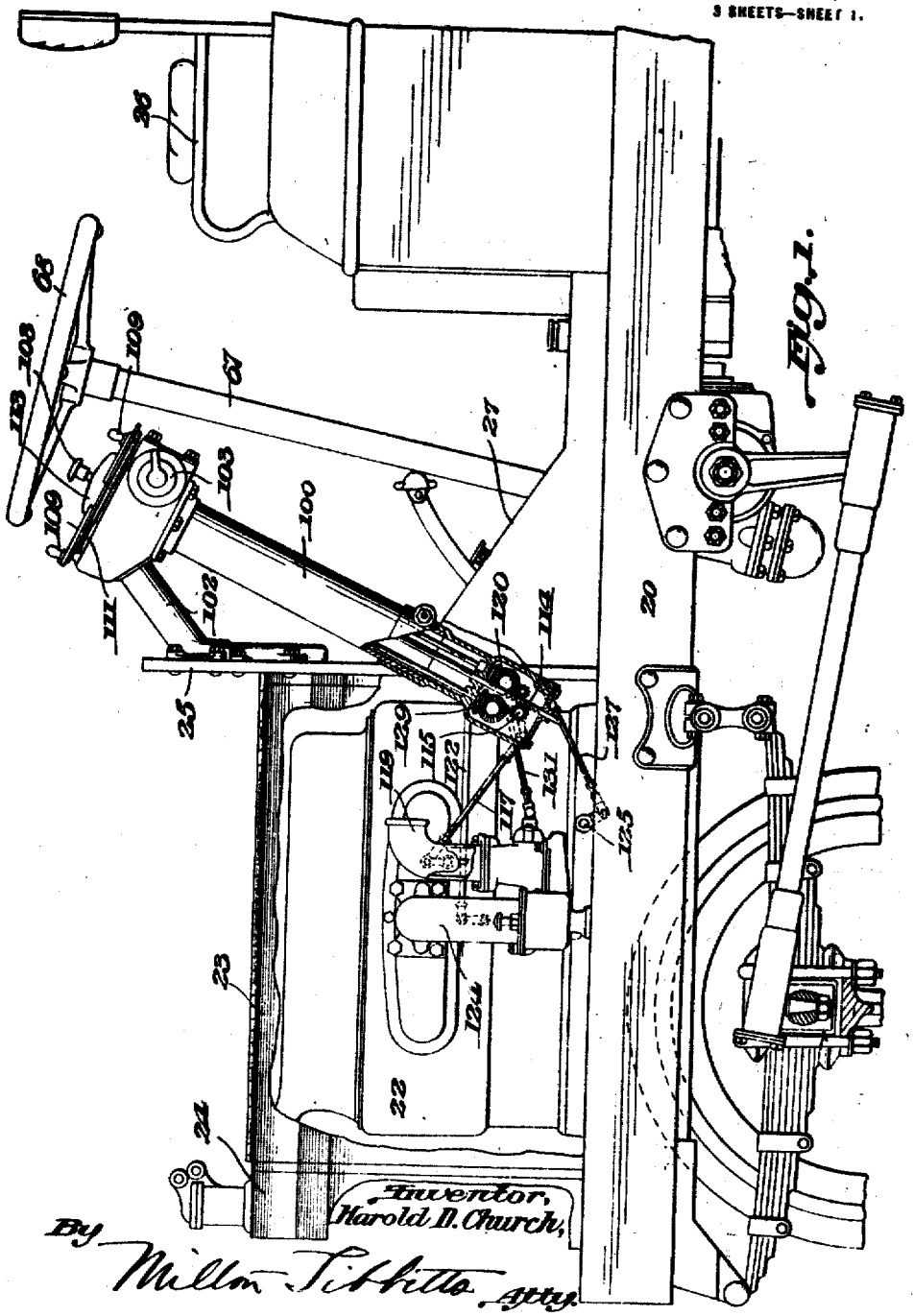

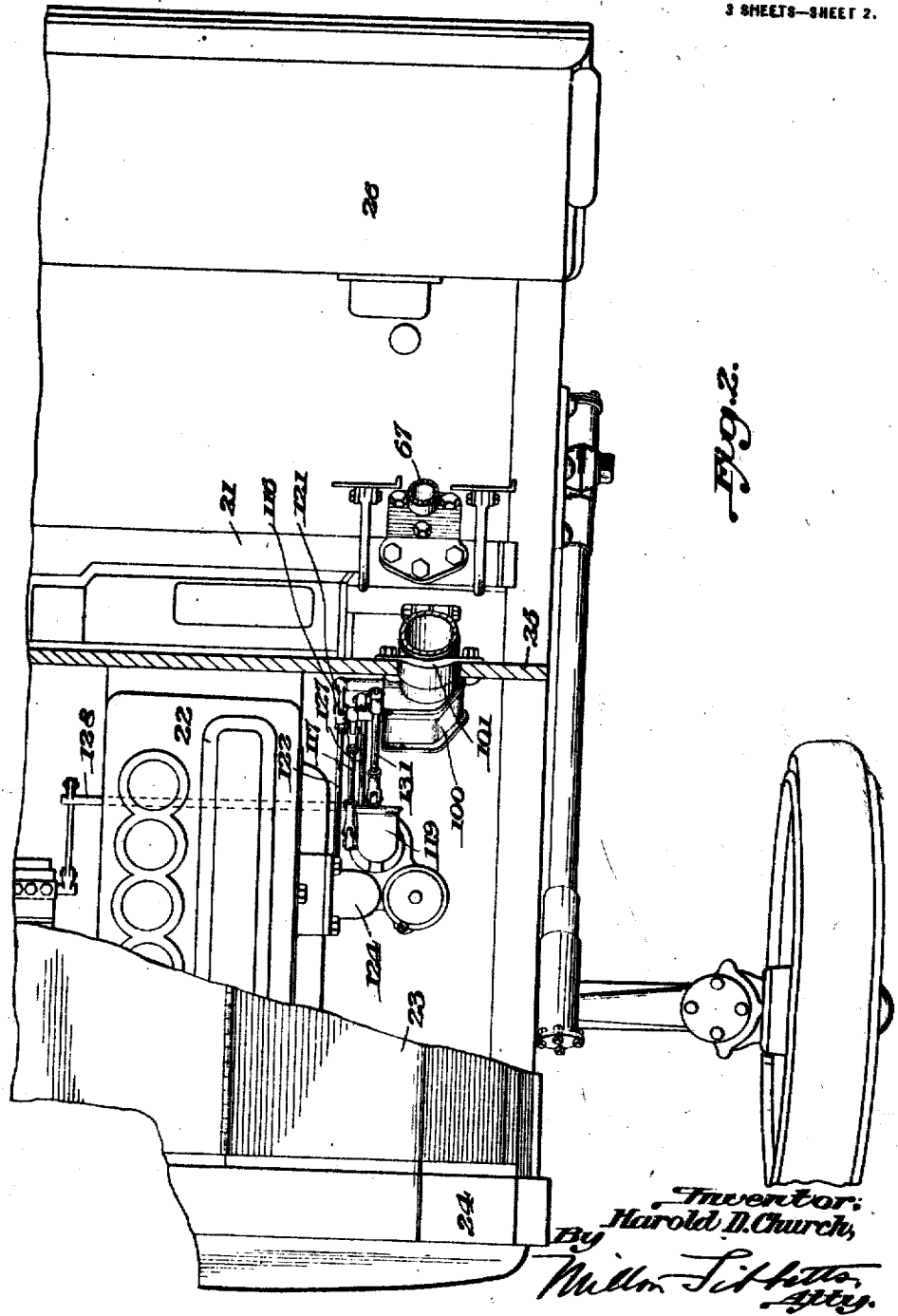

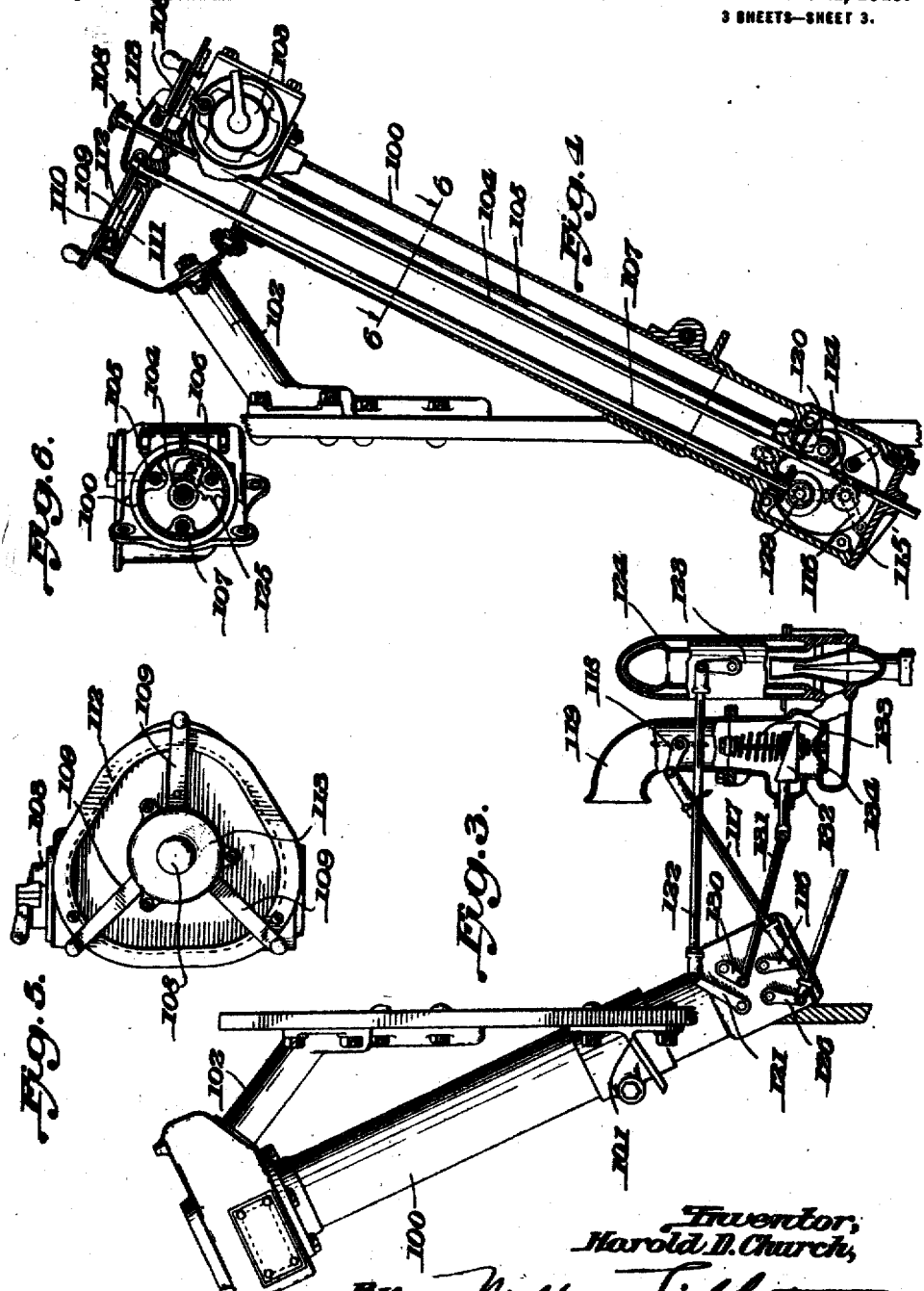

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,321,088.   Specification of Letters Patent.   Patented Nov. 11, 1919.

Original application filed May 29, 1915, Serial No. 31,172. Divided and this application filed April 8, 1918. Serial No. 227,285.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This application is a division of application Serial No. 31,172 filed May 29, 1915.

This invention relates to motor vehicles and particularly to the control mechanism thereof.

One of the objects of the invention is to provide a novel vehicle control mechanism of simple construction and compactly mounted for convenient operation.

Other objects of the invention will appear from the following description taken in connection with the drawings, which form a part of this specification, and in which:

Figure 1 is a left side elevation of a motor vehicle embodying this invention, parts being broken away to show interior construction;

Fig. 2 is a plan view of the vehicle shown in Fig. 1 with parts broken away;

Fig. 3 is an elevation and part sectional view of the casing for the controlling mechanism, the carbureter and intake pipe of the motor, and the various operating connecting rods;

Fig. 4 is a longitudinal sectional view through the casing shown in Fig. 3;

Fig. 5 is a plan view of the casing for the control rods; and

Fig. 6 is a transverse section substantially on the line 6—6 of Fig. 4.

In the drawings, the motor vehicle frame consists principally of the side members 20 and various cross members such as the member 21 shown in Fig. 2. Mounted upon this frame is a motor 22 under the bonnet 23 and between the radiator 24 and the dash 25. The operator's seat is represented at 26, and the floor boards at 27.

For the purpose of mounting the hand control mechanism of the vehicle convenient for operation by the driver, a casing 100 of elongated shape is shown as mounted on the vehicle dash 25. At its lower end, the casing is formed with a flange 101 which is secured to the dash, and at its upper end there is a tubular extension 102 which is connected to the dash 25 at the top thereof. Thus the casing for the operating mechanism is rigidly secured and braced to the dash in front of the steering post 67, and it will be noticed that the upper end of the casing 100 is directly beneath the steering wheel 68 and therefore convenient for the operator, while the lower end extends through the dash 25 and is therefore adjacent the motor where the various operating devices may be conveniently connected to the motor control parts.

The upper part of the casing 100 is enlarged and supports the coil and switch 103 for controlling the ignition of the motor. It also supports four control rods, 104, 105, 106 and 107, the rod 104 being a reciprocating rod and the other three rods being arranged to oscillate. All of these rods extend upwardly through the upper wall of the enlarged part of the casing 101 and the rod 104 is provided with a button 108, by which it may be operated. The other three rods are arranged symmetrically about the rod 104, and each is provided with an operating handle or lever 109. By means of these levers 109, the rods 105, 106 and 107 may respectively be operated and they are retained in adjusted position by a finger 110 on each of the levers engaging in suitable notches 111 on a guide 112. A cap 113 covers the ends of all of the rods except rod 104 which projects through it, and this cap is removably secured to the casing and has side openings for each of the levers 109.

The lower ends of these controlling rods are mounted in suitable bearings in the lower part of the casing 100 and the rod 104 is provided with rack teeth 114 meshing with a gear 115 operating an arm 116 connected to a link 117, which opens and closes a butterfly valve 118 in the main air intake 119 of the motor carbureter. The rod 105 is connected through bevel gears 120, arm 121 and link 122 with the throttle valve 123 in the motor intake pipe 124. The rod 106 is connected through bevel gears 125, arm 126, link 127, and rock shaft 128 with the spark advance mechanism of the motor, which is not shown. The rod 107 is connected through bevel gears 129, arm 130, and link 131, with a wedge 132 for adjusting the tension of the spring 133 on the carbureter air valve 134.

The form of the invention herein shown is illustrative only, and while I have described in some detail a specific embodiment of my invention which I deem to be new and advantageous and will specifically claim, yet I do not desire to be understood that my invention is limited to the exact details of construction as it will be apparent that changes will be made therein without departing from the spirit or scope of the invention.

Having thus described my invention, what I claim and desire to secure by Letters Patent is:—

1. In a control mechanism for motor vehicles, the combination of an elongated casing, oscillating control rods having separate axes mounted therein, means at the upper end of the casing for operating said rods, gearing separately operated by said rods, said casing having a common chamber at its lower end for all of said rod operated gearing and connections extending through said casing from said gearing to the motor for controlling the latter.

2. In a control mechanism for motor vehicles, the combination of an elongated casing, control rods therein extending through the upper wall thereof, operating levers on the projecting ends of said rods, a cap over the rod ends and having side slots for said levers, and another control rod passing through said cap and lower end of said casing and adapted to be reciprocated therein, gears operated separately by said rods, located in a common chamber formed by the lower part of the casing.

3. In a motor vehicle, the combination with a steering post and a dash, of a stationary control casing additional to and spaced from the steering post and comprising a body part, a column part connected at its lower end to the dash, and a bracket part bracing the body part from the dash, and control rods passing through said casing to the vehicle motor.

4. In a motor vehicle, in combination, a vehicle dash, a casing secured to and extending diagonally through the dash, control rods mounted in the casing, gear means operated by the rods located at the lower end of the casing only, within a common chamber thereof and connections leading from said gear means to motor parts and devices at the upper ends of the rods for operating them.

5. In a motor vehicle, in combination, a vehicle dash, a steering post, a casing the axis of which is at an angle to that of the steering post, said casing being secured to and extending diagonally through the dash, said casing being enlarged at its upper end, control rods mounted in the casing and extending through said upper end, and levers on said rods engaging the upper face of said enlarged end, for the purpose described.

In testimony whereof I affix my signature.

HAROLD D. CHURCH.